United States Patent
Lu

(10) Patent No.: US 8,956,121 B2
(45) Date of Patent: Feb. 17, 2015

(54) MULTILAYER-TYPE FAN DEVICE

(76) Inventor: Shun-Tsung Lu, Taichung (TW)

( * ) Notice: Subject to any disclaimer, the term of this patent is extended or adjusted under 35 U.S.C. 154(b) by 608 days.

(21) Appl. No.: 13/311,130

(22) Filed: Dec. 5, 2011

(65) Prior Publication Data

US 2013/0142655 A1 Jun. 6, 2013

(51) Int. Cl.
*F01D 5/06* (2006.01)
*F01D 5/30* (2006.01)

(52) U.S. Cl.
USPC ..................................... 416/201 R

(58) Field of Classification Search
CPC ......... F01D 5/066; F03D 3/005; F03D 3/064; B64C 11/48
USPC .... 416/201 A, 198 R, 201 R, 220 A; 415/4.1, 415/4.2, 4.4, 907
See application file for complete search history.

(56) References Cited

U.S. PATENT DOCUMENTS

| 4,664,598 | A | * | 5/1987 | Milfs et al. | 416/180 |
| 5,800,123 | A | * | 9/1998 | Travor | 416/85 |
| 6,132,172 | A | * | 10/2000 | Li | 416/11 |

\* cited by examiner

*Primary Examiner* — Edward Look
*Assistant Examiner* — Michael Sehn
(74) *Attorney, Agent, or Firm* — C. G. Mersereau; Nikolai & Mersereau, P.A.

(57) ABSTRACT

A multilayer-type fan device has a base, a major blade group and at least one minor blade group. The base is circular and has a top, a bottom, an external surface, an axle hole and at least one inclined plane. The external surface is formed around the base at the bottom of the base. The axle hole is formed through the base from the top to the bottom of the base. The at least one inclined plane is formed on the base between the external surface and the top of the base. The major blade group is mounted on the base and has multiple blades mounted on the external surface of the base at intervals. The at least one minor blade group is mounted on the base and has multiple blades mounted on one of the at least one inclined plane of the base.

3 Claims, 5 Drawing Sheets

MULTILAYER-TYPE FAN DEVICE

BACKGROUND OF THE INVENTION

1. Field of the Invention

The present invention relates to a fan device, and more particularly to a multilayer-type fan device that can be rotated quickly to store more energy via the wind power.

2. Description of Related Art

A conventional wind power generator has a generating set, an impeller and a fan device. The generating set has a driving axle. The driving axle is rotatably mounted in and extends out of the generating set and has a front end. The impeller is securely mounted around the driving axle near the front end of the driving axle. The fan device is securely mounted around the front end of the driving axle and has a base and multiple blades. The base is securely mounted around the front end of the driving axle and has an external surface. The blades are mounted on the external surface of the base of the fan device at intervals and are perpendicular to a driving axle center. The impeller and the fan device can be rotated via the wind power to enable the generating set to generate electric power.

However, the blades of the fan device are perpendicular to the driving axle center and can be rotated only when the direction of the wind is perpendicular to the driving axle center. Therefore, the blades may not rotate when the direction of the wind is not perpendicular to the driving axle center and this will decrease the efficiency of generating power with the blades.

The multilayer-type fan device in accordance with the present invention mitigates or obviates the aforementioned problems.

SUMMARY OF THE INVENTION

The main objective of the present invention is to provide a multilayer-type fan device that can be rotated quickly to store more energy via the wind power.

The multilayer-type fan device in accordance with the present invention has a base, a major blade group and at least one minor blade group. The base is circular and has a top, a bottom, an external surface, an axle hole and at least one inclined plane. The external surface is formed around the base at the bottom of the base. The axle hole is formed through the base from the top to the bottom of the base. The at least one inclined plane is formed on the base between the external surface and the top of the base. The major blade group is mounted on the base and has multiple blades mounted on the external surface of the base at intervals. The at least one minor blade group is mounted on the base and has multiple blades mounted on one of the at least one inclined plane of the base.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
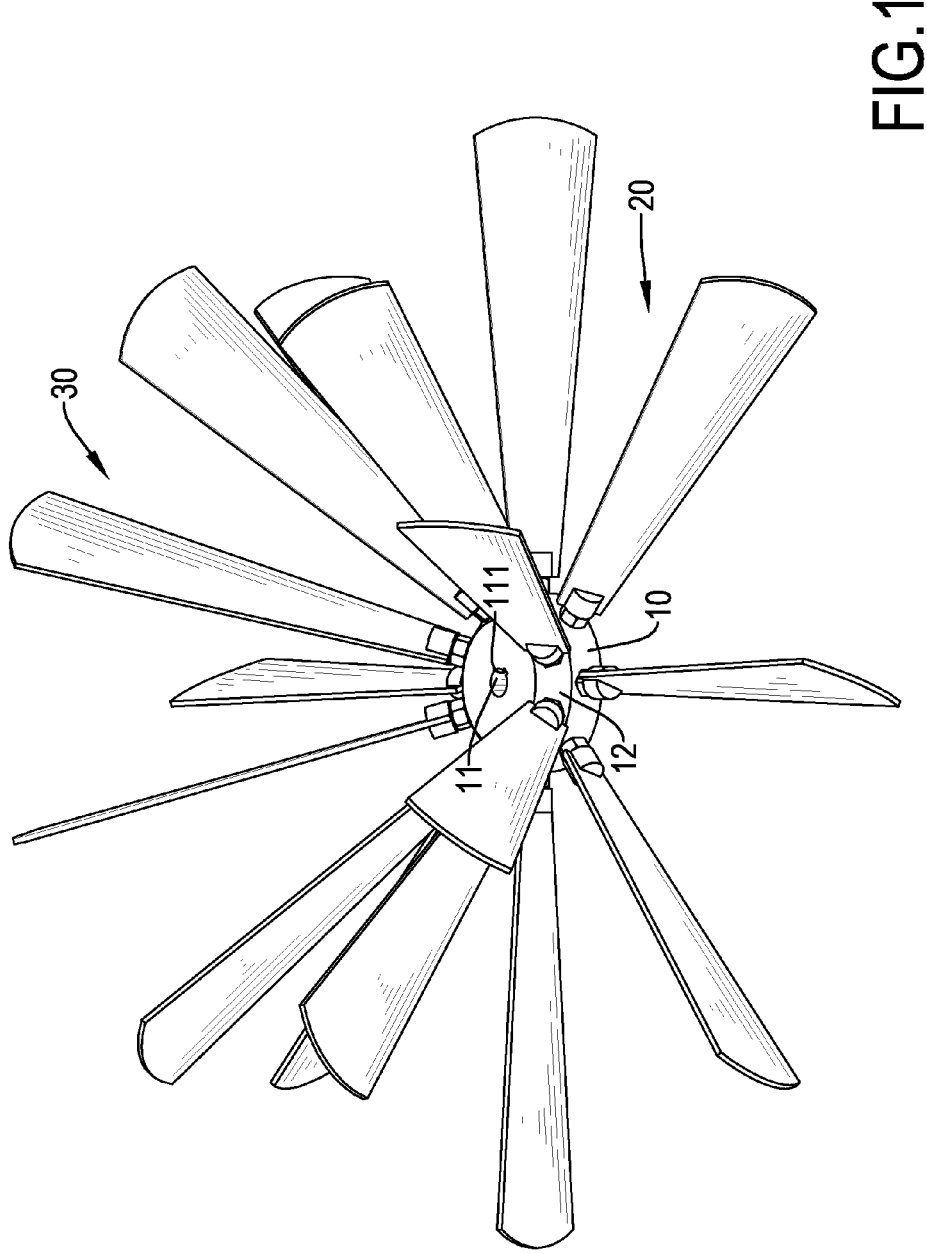
FIG. 1 is a perspective view of a multilayer-type fan device in accordance with the present invention.
Figure 2:
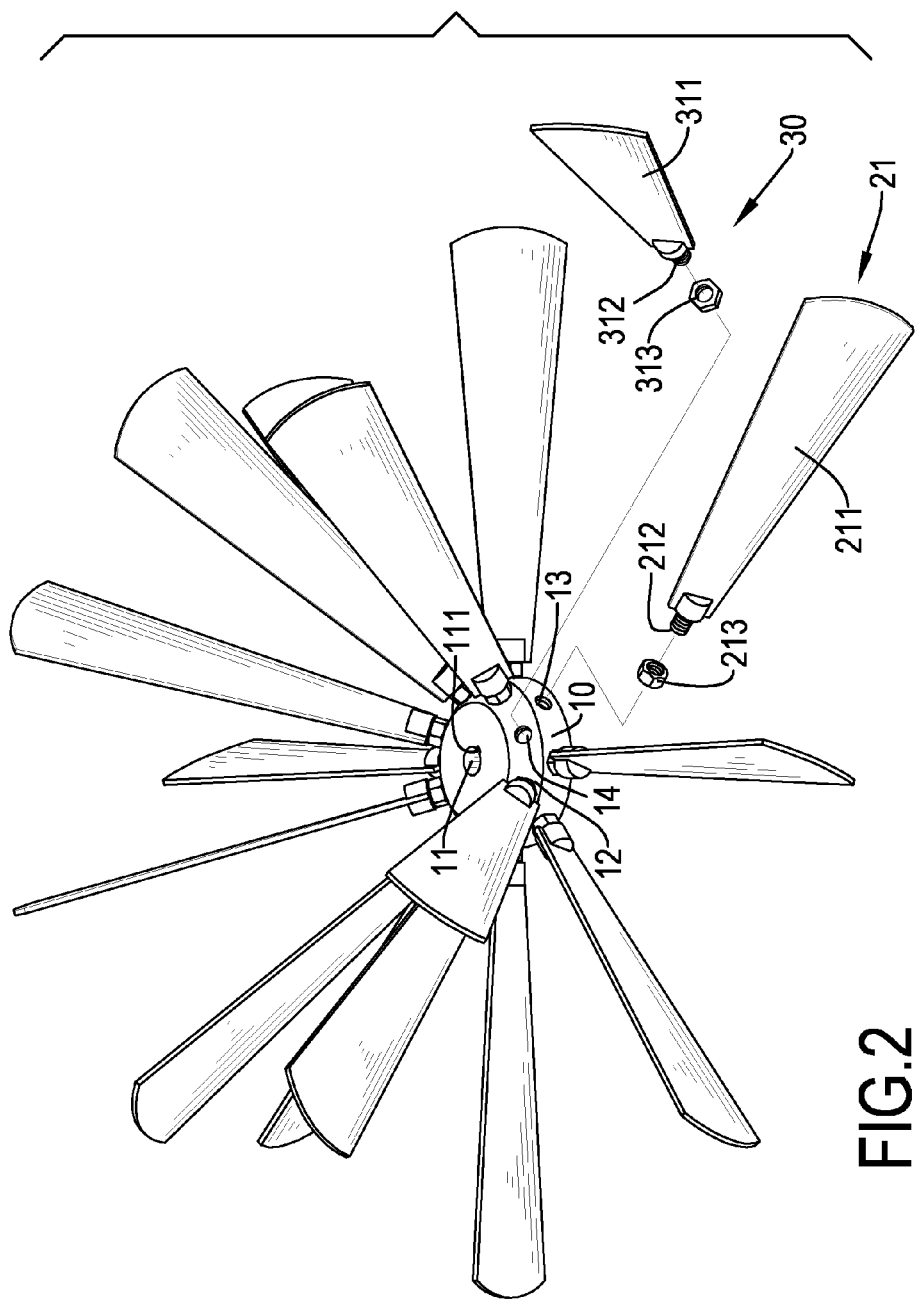
FIG. 2 is an exploded perspective view of the multilayer-type fan device in FIG. 1.
Figure 3:
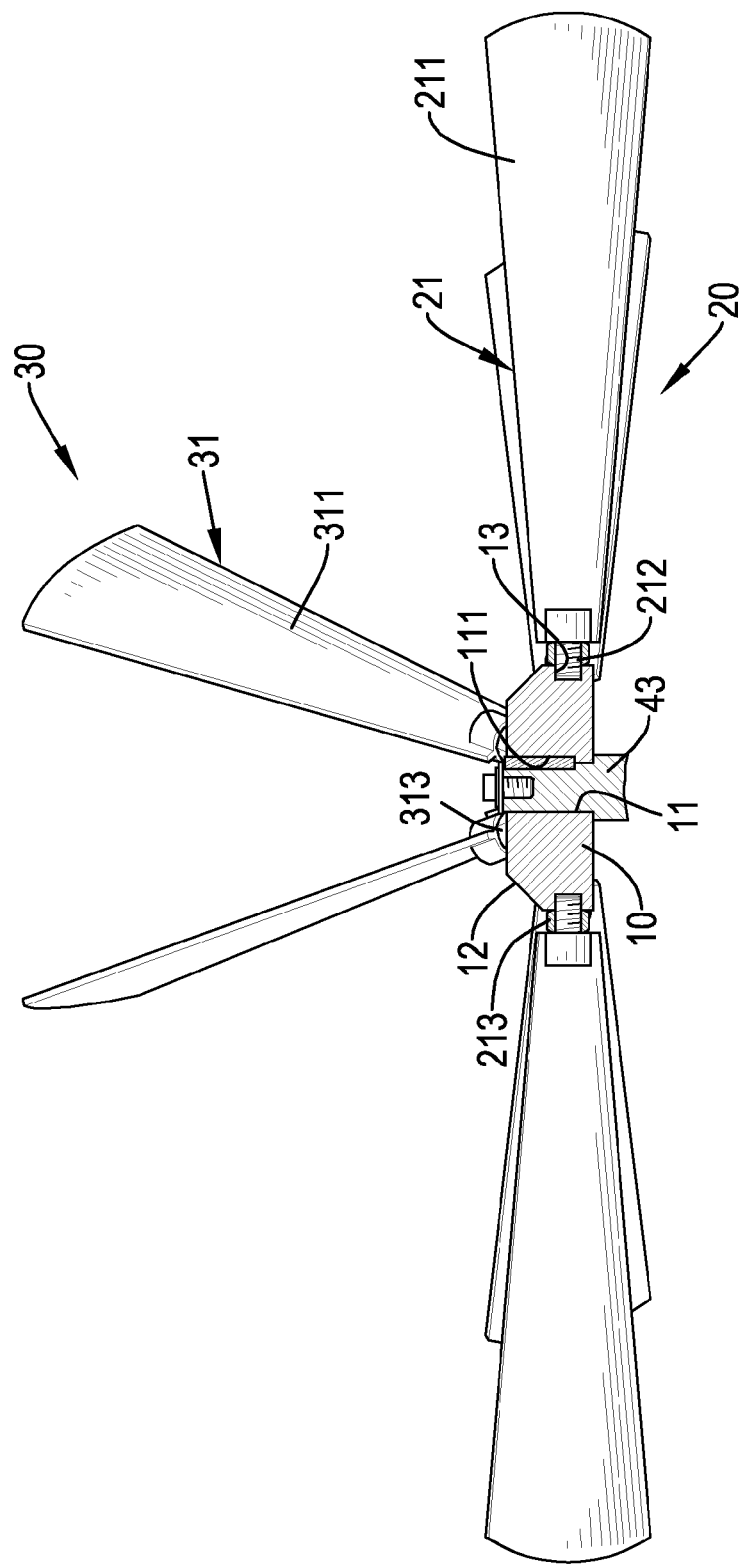
FIG. 3 is a side view in partial section of the multilayer-type fan device in FIG. 1.

With reference to FIGS. 1 to 3, a multilayer-type fan device in accordance with the present invention comprises a base 10, a major blade group 20 and at least one minor blade group 30.

The base 10 is circular and has a top, a bottom, an external surface, a center, an axle hole 11, a key slot 111, at least one inclined plane 12, multiple screwed holes 13 and multiple oblique holes 14. The external surface is formed around the base 10 at the bottom of the base 10. The axle hole 11 is circular and is formed through the center of the base 10 from the top to the bottom of the base 10. The key slot 111 is formed through the top and the bottom of the base 10 and communicates with the axle hole 11. The at least one inclined plane 12 is obliquely formed on the base 10 between the external surface and the top of the base 10. The screwed holes 13 are perpendicularly formed in the external surface of the base 10 at intervals. The oblique holes 14 are perpendicularly formed in the at least one inclined plane 12 at intervals and are arranged in misalignment with the screwed holes 13.

The major blade group 20 is mounted on the base 10 and has multiple blades 21. Each blade 21 is mounted on the external surface of the base 10 and has a body 211, a bolt 212 and a nut 213. The body 211 is a flat panel and has a rear end. The bolt 212 is formed on and protrudes from the rear end of the body 211 and is screwed in one of the screwed holes 13 of the base 10 to enable the corresponding body 211 to extend perpendicularly relative to the external surface of the base 10. The nut 213 is screwed around the bolt 212 and abuts against the external surface of the base 10 to provide a positioning effect to the corresponding blade 21.

The at least one minor blade group 30 is mounted on the base 10 and has multiple blades 31. Each blade 31 of one of the at least one minor blade group 30 is mounted on one of the at least one inclined plane 12 of the base 10 and has a body 311, a bolt 312 and a nut 313. The body 311 is a flat panel and has a rear end. The bolt 312 is formed on and protrudes from the rear end of the body 311 and is screwed in one of the oblique holes 14 of the base 10 to enable the corresponding body 311 to extend perpendicularly relative to the corresponding at least one inclined plane 12 of the base 10. The nut 313 is screwed around the bolt 312 and abuts against the external surface of the base 10 to provide a positioning effect to the corresponding blade 31.

Figure 4:
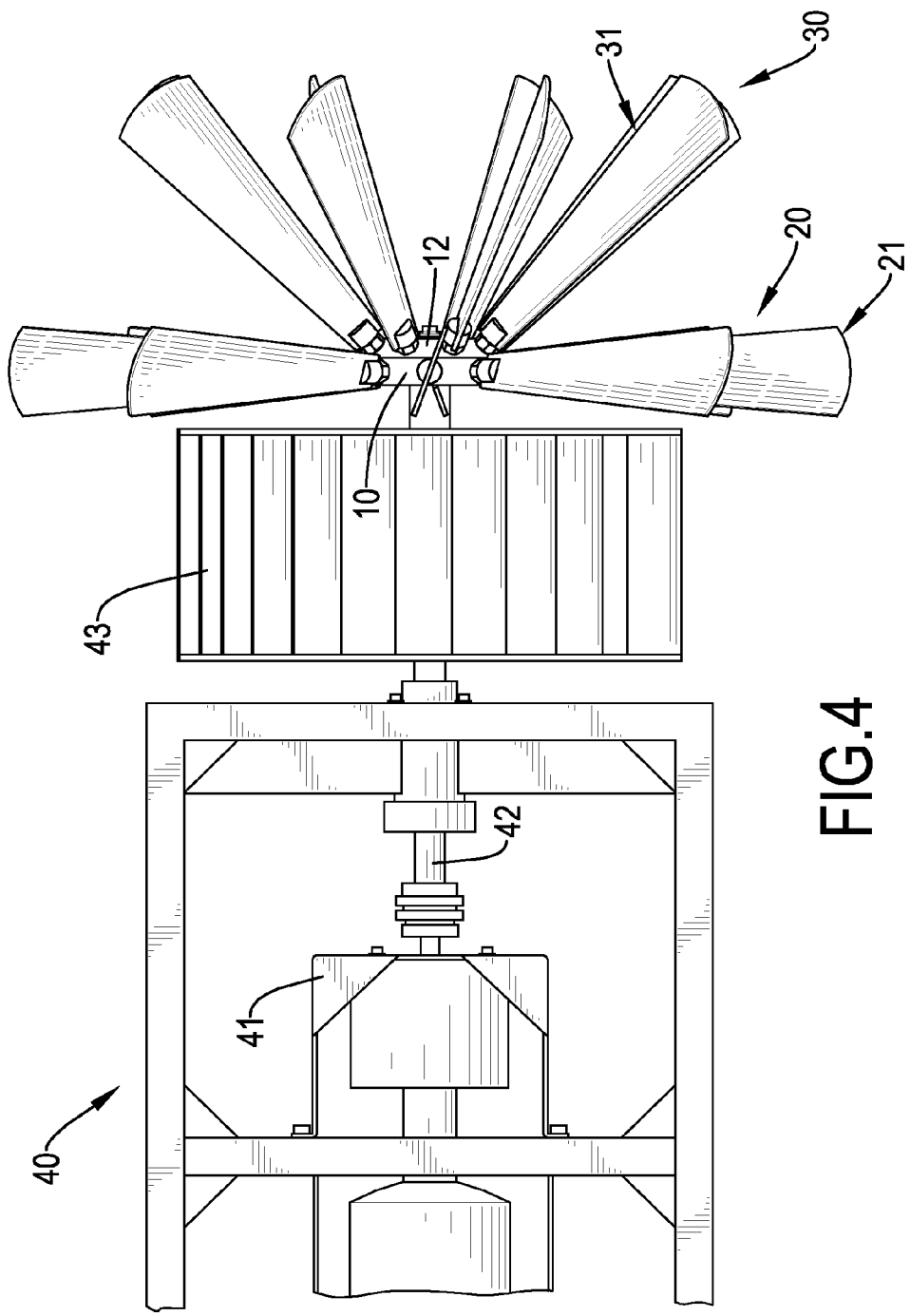
FIG. 4 is an operational side view of the multilayer-type fan device in FIG. 1 mounted on a wind power generator.

With reference to FIGS. 3 and 4, the multilayer-type fan device in accordance with the present invention can be used on a wind power generator 40. The wind power generator 40 has a generating set 41, a driving axle 42 and an impeller 43. The driving axle 42 is rotatably mounted in and extends out of the generating set 41 and has a front end. The impeller 43 is securely mounted around the driving axle 42 between the front end of the driving axle 42 and the generating set 41. The axle hole 11 of the base 10 is securely mounted around the front end of the driving axle 42 by a key block mounted in the key slot 111 to abut against the driving axle 42 and the base 10. Then, the blades 21 of the major blade group 20 are perpendicular to an axle center of the driving axle 42 and the blades 31 of the minor blade group 30 are oblique to the axle center of the driving axle 42.

In use, when the direction of the wind is perpendicular to the axle center of the driving axle 42, the blades 21 of the major blade group 20 can be rotated to enable the driving axle 42 to rotate relative to the generating set 41 to generate electric power. When the direction of the wind is not perpendicular to the axle center of the driving axle 42, the blades 31 of the minor blade group 30 can be rotated to enable the driving axle 42 to rotate relative to the generating set 41 to generate electric power. Therefore, the driving axle 42 can be rotated with the multilayer-type fan device in accordance with the present invention relative to the generating set 41 to generate electric power and is not limited by the direction of the wind. Then, the efficiency of generating power by the wind power generator 40 can be increased.

Figure 5:
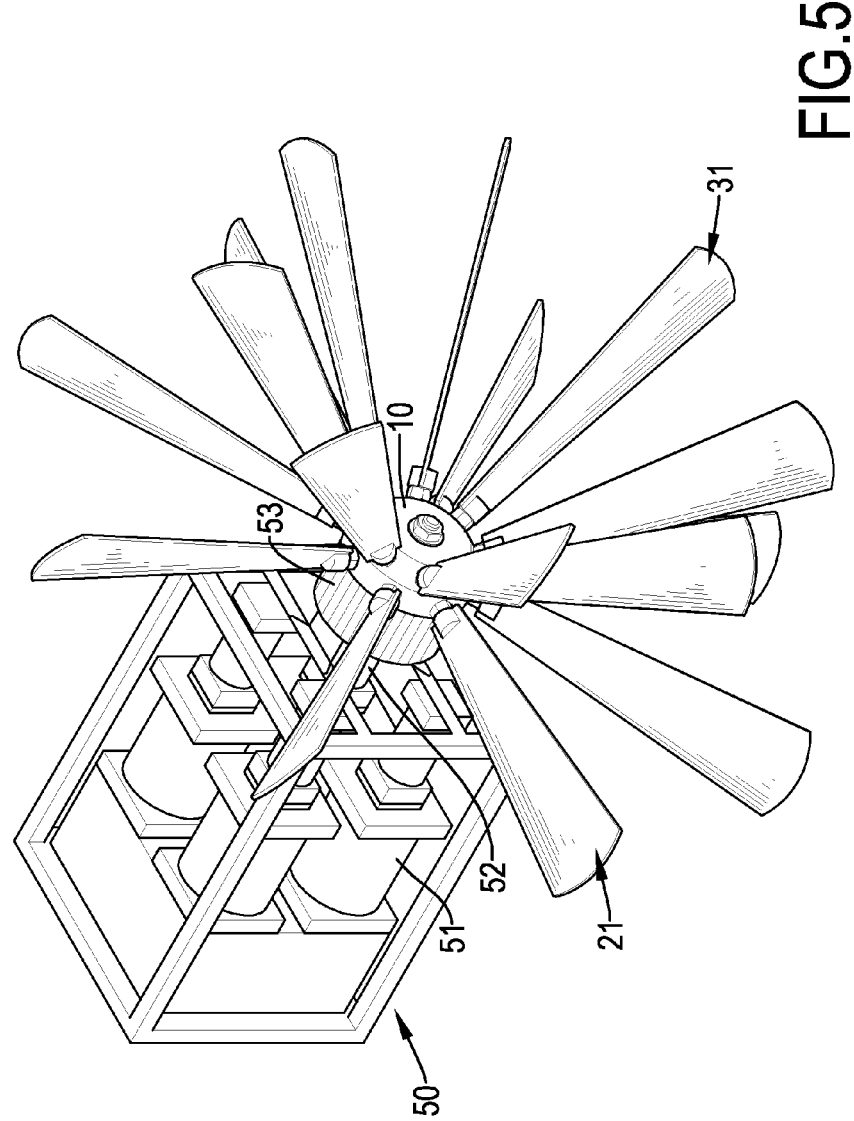
FIG. 5 is an operational side view of the multilayer-type fan device in FIG. 1 mounted on a hydraulic apparatus.

With reference to FIGS. 3 and 5, the multilayer-type fan device in accordance with the present invention also can be used on a hydraulic apparatus 50. The hydraulic apparatus 50 has multiple oil pressure cylinders 51, a driving axle 52 and an impeller 53. The oil pressure cylinders 51 are mounted in the hydraulic apparatus 50. The driving axle is connected to the oil pressure cylinders 51 and has a front end extending out of the hydraulic apparatus 50. The impeller 53 is securely mounted around the driving axle 52 near the front end of the driving axle 52. The axle hole 11 of the base 10 is securely mounted around the front end of the driving axle 52 by a key block mounted in the key slot 111 to abut against the driving axle 52 and the base 10. Then, the blades 21 of the major blade group 20 are perpendicular to an axle center of the driving axle 52 and the blades 31 of the minor blade group 30 are oblique to the axle center of the driving axle 52. In use, the driving axle 52 can be rotated relative to the hydraulic apparatus 50 to drive the oil pressure cylinders 51 by the blades 21, 31 of the blade groups 20, 30 when the direction of the wind is perpendicular to the axle center of the driving axle 52 or not. In addition, the hydraulic apparatus 50 has multiple draft tubes to transport water at a higher position and can use the potential energy of water to generate electric power and this can improve the operation effect of the hydraulic apparatus 50.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multilayer-type fan device having:
    a base being circular and having
        a top;
        a bottom;
        an external surface formed around the base at the bottom of the base;
        a center;
        an axle hole formed through the center of the base from the top to the bottom of the base;
        at least one inclined plane obliquely formed on the base between the external surface and the top of the base;
        multiple screwed holes perpendicularly formed in the external surface of the base at intervals; and
        multiple oblique holes perpendicularly formed in the at least one inclined plane at intervals and arranged in misalignment with the screwed holes; and
    a major blade group mounted on the base and having multiple blades mounted on the external surface of the base at intervals, and each blade of the major blade group having
        a body being a flat panel and having a rear end; and
        a bolt formed on and protruding from the rear end of the body and screwed in one of the screwed holes of the base to enable the corresponding body to extend perpendicularly relative to the external surface of the base; and
    at least one minor blade group mounted on the base and having multiple blades mounted on one of the at least one inclined plane of the base at intervals, and each blade of one of the at least one minor blade group having
        a body being a flat panel and having a rear end; and
        a bolt formed on and protruding from the rear end of the body and screwed in one of the oblique holes of the base to enable the corresponding body to extend perpendicularly relative to the corresponding at least one inclined plane of the base.

2. The multilayer-type fan device as claimed in claim 1, wherein
    the axle hole is circular; and
    the base has a key slot formed through the top and the bottom of the base and communicating with the axle hole.

3. The multilayer-type fan device as claimed in claim 2, wherein
    each blade of the major blade group has a nut screwed around the corresponding bolt and abutting against the external surface of the base to provide a positioning effect to the blade; and
    each blade of said one of the at least one minor blade group has a nut screwed around the corresponding bolt and abutting against the external surface of the base to provide a positioning effect to the blade.

* * * * *